(12) United States Patent
Shinoda et al.

(10) Patent No.: US 9,676,955 B2
(45) Date of Patent: Jun. 13, 2017

(54) COATING LIQUID, LAMINATED POROUS FILM, AND METHOD FOR PRODUCING LAMINATED POROUS FILM

(75) Inventors: Hiroshi Shinoda, Osaka (JP); Hirohiko Hasegawa, Niihama (JP)

(73) Assignee: SUMITOMO CHEMICAL COMPANY, LIMITED, Chuo-ku, Tokyo (JP)

( * ) Notice: Subject to any disclaimer, the term of this patent is extended or adjusted under 35 U.S.C. 154(b) by 236 days.

(21) Appl. No.: 14/239,571

(22) PCT Filed: Aug. 23, 2012

(86) PCT No.: PCT/JP2012/071936
§ 371 (c)(1),
(2), (4) Date: Mar. 21, 2014

(87) PCT Pub. No.: WO2013/031872
PCT Pub. Date: Mar. 7, 2013

(65) Prior Publication Data
US 2014/0329154 A1 Nov. 6, 2014

(30) Foreign Application Priority Data
Aug. 31, 2011 (JP) .................................. 2011-189432

(51) Int. Cl.
*H01M 2/16* (2006.01)
*H01M 2/14* (2006.01)
(Continued)

(52) U.S. Cl.
CPC ............ *C09D 101/286* (2013.01); *C08K 3/22* (2013.01); *C09D 5/028* (2013.01); *C09D 7/1216* (2013.01);
(Continued)

(58) Field of Classification Search
CPC .... H01M 2/145; H01M 2/162; H01M 2/1646; H01M 2/1653; H01M 2/1686;
(Continued)

(56) References Cited

U.S. PATENT DOCUMENTS 6,203,941 B1 * 3/2001 Reichert ............... H01M 2/145
29/623.5
2006/0134526 A1 * 6/2006 Han ...................... H01M 2/145
429/251

(Continued)

FOREIGN PATENT DOCUMENTS

JP 04-146521 A 5/1992
JP 4-146521 A 5/1992
(Continued)

OTHER PUBLICATIONS

Machine Translation of: JP 2010/123383A, Honda et al., Jun. 3, 2010.*

(Continued)

*Primary Examiner* — Kenneth Douyette
(74) *Attorney, Agent, or Firm* — Sughrue Mion, PLLC

(57) ABSTRACT

The present invention provides a coating liquid, a laminated porous film and a method for producing a laminated porous film. The coating liquid comprises a binder resin, a filler and a medium, wherein the filler is a mixture comprising (a) a filler having a specific surface area of not less than 7 $m^2/g$ and not more than 80 $m^2/g$ and (b) a filler having a specific surface area of not less than 3 $m^2/g$ and not more than 6 $m^2/g$ in a filler (a) to filler (b) weight ratio of from 5:95 to 40:60. The laminated porous film is a laminated porous film in which a heat-resistant layer is laminated on one or both of the surfaces of a porous film substrate, wherein the heat-resistant layer is a heat-resistant layer formed by removing the medium from the coating liquid.

13 Claims, 1 Drawing Sheet

(51) Int. Cl.
*C08K 3/22* (2006.01)
*C09D 5/02* (2006.01)
*C09D 101/28* (2006.01)
*C09D 7/12* (2006.01)
*C09D 129/04* (2006.01)
*H01M 2/34* (2006.01)
*C09D 5/18* (2006.01)

(52) U.S. Cl.
CPC ......... *C09D 7/1258* (2013.01); *C09D 129/04* (2013.01); *H01M 2/145* (2013.01); *H01M 2/162* (2013.01); *H01M 2/1646* (2013.01); *H01M 2/1653* (2013.01); *H01M 2/1686* (2013.01); *C08K 2003/2227* (2013.01); *C09D 5/18* (2013.01); *H01M 2/348* (2013.01); *H01M 2200/00* (2013.01)

(58) Field of Classification Search
CPC .. C09D 101/286; C09D 129/04; C09D 5/028; C09D 7/1216; C09D 7/1258; C08K 3/22
See application file for complete search history.

(56) References Cited

U.S. PATENT DOCUMENTS

| | | | |
|---|---|---|---|
| 2008/0070107 A1 | 3/2008 | Kasamatsu et al. | |
| 2009/0325074 A1 | 12/2009 | Fukumoto et al. | |
| 2010/0112432 A1 | 5/2010 | Nishida et al. | |
| 2011/0091774 A1 | 4/2011 | Wakizaka et al. | |

FOREIGN PATENT DOCUMENTS

| | | | | |
|---|---|---|---|---|
| JP | 11-021473 | A | 1/1999 | |
| JP | 2002-294590 | A | 10/2002 | |
| JP | 2004-130738 | A1 * | 4/2004 | ............... B41J 2/01 |
| JP | 2004-227972 | A | 8/2004 | |
| JP | WO2006/080459 | A1 | 8/2006 | |
| JP | 2006-331760 | A | 12/2006 | |
| JP | 2007-311151 | A | 11/2007 | |
| JP | 2010-123383 | A | 6/2010 | |
| JP | 2012-54229 | A | 3/2012 | |
| WO | 2006/080459 | A1 | 8/2006 | |
| WO | 2008/012331 | A1 | 10/2008 | |
| WO | 2009/123168 | A | 10/2009 | |
| WO | 2012/018133 | A1 | 2/2012 | |

OTHER PUBLICATIONS

English Translation of: JP 04/146521A, Ryomo et al., May 20, 1992.*
Machine Translation of: JP 2004/130738 A, Asai et al., Apr. 30, 2004.*
Communication dated Dec. 17, 2015, from the State Intellectual Property Office of People's Republic of China in counterpart Application No. 201280041584.6.
First Office Action issued May 11, 2015 in corresponding Chinese Patent Application No. 201280041584.6 with translation.
Notice of Reasons for Rejection issued May 10, 2016 in corresponding Japanese Patent Application No. 2012-185674 with translation.

* cited by examiner

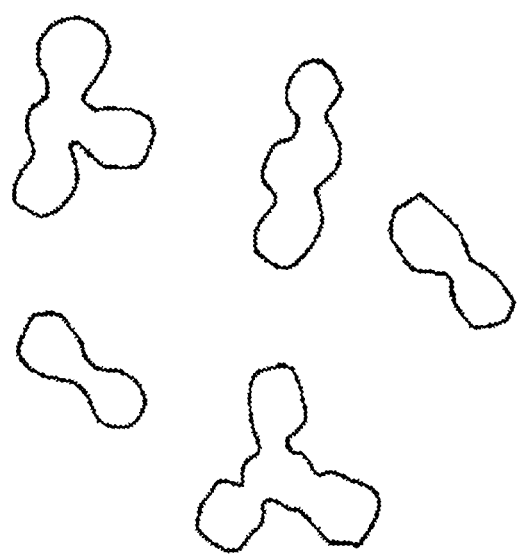

COATING LIQUID, LAMINATED POROUS FILM, AND METHOD FOR PRODUCING LAMINATED POROUS FILM

CROSS REFERENCE TO RELATED APPLICATIONS

This application is a National Stage of International Application No. PCT/JP2012/071936filed Aug. 23, 2012, claiming priority based on Japanese Patent Application No. 2011-189432 filed Aug. 31, 2011, the contents of all of which are incorporated herein by reference in their entirety.

TECHNICAL FIELD

The present invention relates to a coating liquid to be used for the production of a laminated porous film suitable as a separator for a non-aqueous electrolyte secondary battery, and a laminated porous film produced using the coating liquid.

BACKGROUND ART

Non-aqueous electrolyte secondary batteries, especially lithium secondary batteries, have been used widely as the batteries to be used for personal computers, cellular phones, personal digital assistant devices, etc. due to their high energy densities.

Such non-aqueous electrolyte secondary batteries typified by lithium secondary batteries are high in energy density and they may generate heat due to the occurrence of high current when internal short-circuit or external short-circuit has been caused, for example, by damage to a battery or damage to an instrument using a battery therein. Therefore, non-aqueous electrolyte secondary batteries have been demanded to prevent generation of a certain amount or more of heat and secure high safety.

A method of imparting a shut-down function to prevent further heat generation by blocking the passage of ions between the positive and negative electrodes with a separator at the time of abnormal heat generation is common as means for securing safety. One known technique for providing a separator with a shut-down function is a technique of using a porous film made of a material that melts on abnormal heat generation. In a battery using this separator, the porous film melts and closes pores on abnormal heat generation to block the passage of ions and thereby can suppress further generation of heat.

As a separator having such a shut-down function, a porous film made of a polyolefin is used, for example. A separator made of the porous polyolefin film melts and closes pores at about 80 to 180° C. on abnormal heat generation of a battery to block (shut-down) the passage of ions and thereby suppress further generation of heat. However, in some cases, a separator made of the porous film allows a positive electrode and a negative electrode to come into direct contact with each other due to the shrinkage, rupture, or the like thereof, resulting in the occurrence of short circuit. A separator made of a polyolefin porous film may have insufficient shape stability and may be unable to suppress abnormal heat generation caused by short circuit.

Some non-aqueous electrolyte secondary battery separators excellent in shape stability at high temperatures have been proposed. One of the measures proposed to that end is a non-aqueous electrolyte secondary battery separator composed of a laminated porous film in which a heat-resistant layer comprising a filler is laminated with a porous film mainly comprising a polyolefin to serve as a substrate (the porous film is hereinafter sometimes referred to as a "porous film substrate") (see, for example, Patent Document 1). One of the problems with such a separator is preventing the filler from coming away from the surface of the laminated porous film.

In a case that a filler comes away from a separator, some defects may occur such as failure to develop properties expected as a separator and pollution of an apparatus with a powder (filler) that has come away during the fabrication of a battery.

As a method for preventing a filler from coming away, there have been proposed a method in which the surface of the filler is modified (see, for example, Patent Document 2), a method in which the chemical structure of the binder resin to which the filler is to be bound is characterized (see, for example, Patent Document 3), and a method in which the average fiber diameter of the fibers to which the filler is to be fixed and the particle diameter of the filler are controlled to have a prescribed relation (see, for example, Patent Document 4).

However, these methods insufficiently can prevent a filler from coming away, and further improvement has been demanded.

PRIOR ART DOCUMENTS

Patent Documents

Patent Document 1: JP-A-2004-227972
Patent Document 2: JP-A-2007-311151
Patent Document 3: WO 2009/123168
Patent Document 4: JP-A-2006-331760

SUMMARY OF THE INVENTION

It is an object of the present invention to provide a coating liquid suitable for forming a separator being high in shape stability at high temperatures and in ion permeability and further preventing a filler from coming away, and provide a separator having a layer formed from the coating liquid.

The present invention provides the following:

<1> A coating liquid comprising a binder resin, a filler and a medium, wherein the filler is a mixture comprising (a) a filler having a specific surface area of not less than 7 $m^2/g$ and not more than 80 $m^2/g$ and (b) a filler having a specific surface area of not less than 3 $m^2/g$ and not more than 6 $m^2/g$ in a filler (a) to filler (b) weight ratio of from 5:95 to 40:60.

<2> The coating liquid according to <1>, wherein the specific surface area of the filler (a) is not less than 7 $m^2/g$ and not more than 40 $m^2/g$.

<3> The coating liquid according to <1> or <2>, wherein the weight proportion of the filler is not less than 20 and not more than 100 where the weight of the binder resin is taken as 1.

<4> The coating liquid according to any one of <1> to <3>, wherein the filler (b) mainly comprises bound particles in a form in which a plurality of primary particles have aggregated and adhered to each other.

<5> The coating liquid according to any one of <1> to <4>, wherein the shape of the filler (b) mainly comprises non-spherical bound particles in a form in which a plurality of primary particles have aggregated and adhered to each other.

<6> The coating liquid according to any one of <1> to <5>, wherein the filler is an inorganic filler.

<7> The coating liquid according to <6>, wherein the inorganic filler is alumina.

<8> The coating liquid according to any one of <1> to <7>, wherein the binder resin is a water-soluble polymer.

<9> The coating liquid according to <8>, wherein the water-soluble polymer is at least one member selected from the group consisting of carboxyalkyl celluloses, alkyl celluloses, hydroxyalkyl celluloses, starch, polyvinyl alcohol and sodium alginate.

<10> A laminated porous film in which a heat-resistant layer comprising a filler and a binder resin is laminated on one or both of the surfaces of a porous film substrate, wherein the heat-resistant layer is a heat-resistant layer formed by removing the medium from the coating liquid according to any one of <1> to <9>.

<11> The laminated porous film according to <10>, wherein the porous film substrate is a porous film mainly comprising a polyolefin.

<12> A method for producing a laminated porous film in which a heat-resistant layer comprising a filler and a binder resin is laminated on one or both of the surfaces of a porous film substrate, the method comprising a step of forming the heat-resistant layer by removing the medium from the coating liquid according to any one of <1> to <9>.

<13> The method according to <12>, the method further comprising a step of applying the coating liquid directly to the porous film substrate.

BRIEF DESCRIPTION OF THE DRAWING

FIG. 1 is a schematic diagram of non-spherical bound particles.

MODE FOR CARRYING OUT THE INVENTION

<Coating Liquid>

The present invention relates to a coating liquid comprising a binder resin, a filler and a medium, wherein the filler is a mixture comprising (a) a filler having a specific surface area of not less than 7 $m^2/g$ and not more than 80 $m^2/g$ and (b) a filler having a specific surface area of not less than 3 $m^2/g$ and not more than 6 $m^2/g$ in a filler (a) to filler (b) weight ratio of from 5:95 to 40:60.

The coating liquid of the present invention can be used suitably for the formation of a heat-resistant layer comprising a filler and a binder resin (hereinafter referred to as a "B layer") in a laminated porous film in which a porous film substrate (hereinafter referred to as an "A layer") and the B layer are laminated. The laminated porous film is suitably used as a separator, especially a non-aqueous electrolyte secondary battery separator. The coating liquid of the present invention can be called a coating slurry because a filler has been dispersed in a medium.

The heat-resistant layer (the B layer) formed from the coating liquid is a layer in which the filler contained in the coating liquid is bound with the binder resin and the layer has heat resistance at the temperature at which the porous film substrate (the A layer) closes pores and imparts shape retention function to the laminated porous film. The B layer can be produced by removing the medium from the coating liquid.

The porous film substrate can have a property to melt to close pores at high temperatures, and when the laminated porous film is in use as a separator, the A layer melts to close pores on abnormal heat generation of a battery and thereby imparts a shut-down function to the laminated porous film. The A layer is described in detail later.

A detailed description is made below to the constituent substances of the coating liquid.

<Binder Resin>

As the binder resin contained in the coating slurry, preferred is a resin that has performance to bind particles of the filler to each other or the filler to the porous film substrate, is slightly soluble in the electrolyte of a battery, and is electrochemically stable during the use of the battery.

Examples of the binder resin include binder resins such as polyolefins, including polyethylene and polypropylene; fluorine-containing resins, including polyvinylidene fluoride and polytetrafluoroethylene; fluorine-containing rubbers, including vinylidene fluoride-hexafluoropropylene-tetrafluoroethylene copolymers and ethylene-tetrafluoroethylene copolymers; rubbers, including styrene butadiene copolymers as well as their hydrogenated forms, methacrylic ester copolymers, acrylonitrile-acrylic ester copolymers, styrene-acrylic ester copolymers, ethylene propylene rubber, and polyvinyl acetate; resins having a melting point or glass transition temperature of not lower than 180° C., including polyphenylene ether, polysulfone, polyethersulfone, polyphenylene sulfide, polyetherimide, polyamide-imide, polyetheramide, and polyester; polyvinyl alcohol, polyethylene glycol, cellulose ether, sodium alginate, polyacrylic acid, polyacrylamide, and polymethacrylic acid.

Although the binder resin may be dispersed in the coating liquid, a binder resin that can dissolve in the coating liquid is preferred in that it can enhance the uniformity of the coating liquid and can bind the filler therewith in a smaller amount.

The binder resin capable of being dissolved in the coating liquid depends on the type of the medium in the coating liquid; of binder resins, water-soluble polymers are preferred in process and environmental load because a solvent mainly composed of water can be used as a solvent. The water-soluble polymer is preferably at least one member selected from the group consisting of carboxyalkyl celluloses, alkyl celluloses, hydroxyalkyl celluloses, starch, polyvinyl alcohol and sodium alginate, and especially cellulose ethers are particularly preferred.

Specific examples of the cellulose ether include carboxymethylcellulose (CMC), hydroxyethylcellulose (HEC), carboxyethylcellulose, methylcellulose, ethylcellulose, cyanoethyl cellulose, and oxyethyl cellulose; CMC and HEC, which are superior in chemical stability, are particularly preferred, and especially, CMC is preferred. The carboxyalkyl cellulose may be a metal salt of a carboxyalkyl cellulose. Carboxymethylcellulose (CMC) includes sodium carboxymethylcellulose.

<Filler>

An inorganic filler or an organic filler can be used as the filler. Specific examples of the organic filler include fillers made of organic substances such as copolymers of two or more of or homopolymers of styrene, vinyl ketone, acrylonitrile, methyl methacrylate, ethyl methacrylate, glycidyl methacrylate, glycidyl acrylate, methyl acrylate, etc.; fluororesins, such as polytetrafluoroethylene, tetrafluoroethylene-hexafluoropropylene copolymers, tetrafluoroethylene-ethylene copolymers, and polyvinylidene fluoride; melamine resins; urea resins; polyethylenes; polypropylenes; and polymethacrylates, and specific examples of the inorganic filler include fillers made of inorganic substances such as calcium carbonate, talc, clay, kaolin, silica, hydrotalcite, diatomaceous earth, magnesium carbonate, barium carbonate, calcium sulfate, magnesium sulfate, barium sulfate, aluminum hydroxide, magnesium hydroxide, calcium oxide, magnesium oxide, titanium oxide, alumina, mica, zeolite, and glass. These fillers may be used singly or in a mixture of two or more members thereof.

Of these, inorganic fillers are preferred as the filler, inorganic oxide fillers are more preferred, and alumina filler is particularly preferred from the viewpoints of heat resistance and chemical stability.

While alumina includes many crystal forms, such as α-alumina, β-alumina, γ-alumina, and θ-alumina, any of them can be used suitably. Of these, α-alumina is most preferable because of its particularly high thermal or chemical stability.

Such materials of the filler each can be used singly. Two or more materials can also be used in combination.

The filler contained in the coating liquid is preferably composed substantially only of (a) a filler having a specific surface area of not less than 7 $m^2/g$ and not more than 80 $m^2/g$ and (b) a filler having a specific surface area of not less than 3 $m^2/g$ and not more than 6 $m^2/g$, and the weight ratio filler (a) : filler (b) is from 5:95 to 40:60. That the specific surface area of the filler (a) is not more than 40 $m^2/g$ is preferred in that the surface of the laminated porous film obtained using the coating liquid becomes smoother.

Of the two fillers, the filler (b), which has a smaller specific surface area, will form the main backbone of a heat-resistant layer in the event that the heat-resistant layer is formed using the coating liquid.

Because of the larger specific surface area, the filler (a) allows the binder resin to attach thereto in a larger amount and increases bind points between the filler particles and the binder resin in the heat-resistant layer, so that it has an effect to improve the capability to bind filler particles.

As described below, the filler (a) also has an action to inhibit a binder resin from excessively penetrating into pores of a porous film substrate in producing a laminated porous film.

That the specific surface area of the filler (a) is not less than 8 $m^2/g$ and not more than 12 $m^2/g$, that the specific surface area of the filler (b) is not less than 3 $m^2/g$ and not more than 6 $m^2/g$, and that the weight ratio filler (a):filler (b) is from 10:90 to 30:70 are preferred in that a heat-resistant layer being high in porosity and excellent in ion permeability can be obtained without allowing the filler (a) to clog vacancies possessed by the structure that forms the main backbone of the heat-resistant layer formed by the filler (b)

The material of the filler (a) and the material of the filler (b) may be either the same or different.

The filler can be in various shapes depending upon the method for producing the filler material or dispersion conditions to be used in the preparation of the coating liquid, such as a spherical shape, an oval shape, a short shape, and an infinite shape without any specific shape, and any shape can be used.

From the viewpoint of improvement in ion permeability, it is preferred for the filler (b) to mainly comprise bound particles composed of a plurality of primary particles that have aggregated and adhered to each other. As referred to herein, "mainly comprising" means that 70% by weight or more, preferably 90% by weight or more (including 100% by weight) of the whole of the filler (b) is accounted for by bound particles.

Particularly, it is preferred that the filler (b) mainly comprises bound particles in a non-spherical shape (hereinafter sometimes referred to as "non-spherical bound particles"). As referred to herein, the "non-spherical bound particles" means a straight shape, a straight shape having a branch, or a gourd-like shape as depicted in FIG. 1 and do not include a spherical shape or a near spherical shape. If the filler (b) is composed of non-spherical bound particles, the filler is hardly packed densely in a heat-resistant layer and, accordingly, a heat-resistant layer having a higher porosity and being excellent in ion permeability can be formed.

The non-spherical bound particles preferably contain 2 or more in average, and more preferably 4 to 30 primary particles. The average number of the primary particles of the non-spherical bound particles is defined by an average of the numbers of primary particles counted for each of five non-spherical bound particles chosen arbitrarily with a scanning electron microscope (SEM).

The non-spherical bound particles as the filler (b) are preferably in the form that the particles have adhered as a result of being melted partly by heating treatment. If in such a form, it is avoided successfully that primary particles come away from the non-spherical bound particles even during a dispersion process in producing a coating liquid.

In order to improve the ion permeability in the heat-resistant layer and more inhibit the filler from coming away, the weight ratio of the filler to the binder resin (the proportion in weight of the filler where the weight of the binder resin is taken as 1) is preferably not less than 20 and not more than 100 in the coating liquid as well as in the B layer formed from the coating liquid.

The content of the filler is preferably 60% by volume or more, more preferably 70% by volume or more, and even more preferably 80% by volume or more where the total content of the solid (the filler and the binder resin) in the coating liquid is taken as 100% by volume in order to more efficiently inhibit vacancies formed by filler particles in contact with each other from being clogged with other constituent ingredients, such as the binder resin, in a resulting heat-resistant layer thereby keeping good the ion permeability.

<Medium>

The medium (solvent and dispersing medium) can dissolve or disperse the filler and the binder resin and has characteristics as a dispersing medium. The medium may be either a single medium or a mixed medium, and it is not particularly restricted in this aspect.

In the case of using, as the A layer, a porous polyolefin film to be used commonly as a separator for a non-aqueous electrolyte secondary battery, examples of the medium include water, alcohols such as, methanol, ethanol, and isopropanol, acetone, toluene, xylene, hexane, N-methylpyrrolidone, N,N-dimethylacetamide, and N,N-dimethylformamide, and these can be used singly or a plurality of them may be mixed to use as the medium as long as they dissolve with each other.

Although the medium may be composed of only water, a mixed solvent of water and an organic polar solvent is preferred in that the drying removal rate is increased and it has sufficient solvency for the above-described water-soluble polymer. When the solvent is composed of only an organic solvent, the solvent may be deficient in leveling due to an excessively increased drying rate, and it also may be deficient in solvency in the case of using the above-described water-soluble polymer as the binder resin.

As the organic polar solvent to be used for the mixed solvent, alcohols that are miscible with water in any proportions and have moderate polarities are preferred, and of them, methanol, ethanol, and isopropanol are used. While the proportions of the water and the organic polar solvent are chosen in consideration with the leveling property and the binder resin to be used, the mixed solvent usually contains water in a content of 50% by weight of more.

The coating liquid may, as required, contain ingredients other than the filler and the binder resin as long as the object of the present invention is not impaired drastically. Examples of such ingredients include a dispersing agent, a plasticizer, and a pH adjuster.

<Method for Producing Coating Liquid>

The method for obtaining the coating liquid by dispersing or dissolving the filler and the binder resin in the medium is not particularly restricted if it is a method necessary for obtaining a uniform coating liquid.

Examples thereof include a mechanical agitation method, an ultrasonic dispersion method, a high pressure dispersion method, and a media dispersion method.

The order of mixing is arbitrary as long as no particular problem, such as generation of precipitations, is caused; for example, the filler, the binder resin, and other ingredients may be added to the solvent at once and then mixed, or alternatively the respective ingredients may be separately dispersed in the solvent and then mixed.

<Laminated Porous Film>

Next, description is made to the laminated porous film.

The laminated porous film is a laminated porous film in which a heat-resistant layer comprising a filler and a binder resin (B layer) is laminated on one or both of the surfaces of a porous film substrate (A layer). The B layer is a heat-resistant layer that has been formed by removing the medium from the above-described coating liquid.

In the laminated porous film, the B layer has heat resistance at high temperatures at which shut-down occurs and imparts a shape stability function to the laminated porous film. The A layer melts to close pores on abnormal heat generation of a battery and thereby imparts a shut-down function to a separator.

In the event that the binder resin is a water-soluble polymer in producing the B layer, when a coating liquid has been applied onto the A layer, the coating liquid penetrates into pores (vacancies) of the A layer, so that the B layer and the A layer are bound together by an effect that the water-soluble polymer in the slurry deposits, so-called an "anchor effect". At this time, if the water-soluble polymer in the slurry deposits with the polymer penetrating excessively into the pores (vacancies) in the A layer, the shut-down capability or the permeability (ion permeability) of a resulting non-aqueous electrolyte secondary battery separator may be deteriorated.

It is preferred that the medium in the coating liquid is a mixed solvent comprising water and an organic polar solvent, and such a medium can more efficiently suppress the generation of coating-unevenness, shedding the coating liquid, etc. in the application of the coating liquid to the A layer, and can more efficiently suppress the generation of film defects in the B layer to be formed. Accordingly, a non-aqueous electrolyte secondary battery separator having more improved uniformity of the B layer and having been improved in shut-down capability or permeability (ion permeability) can be obtained.

Hereafter, detailed description is made to the physical properties and the production methods of the porous film substrate (the A layer), the heat-resistant layer (the B layer), and the laminated porous film.

<Porous Film Substrate (A Layer)>

The A layer has such a structure that the layer has therein interconnected fine pores and allows a gas and a liquid to permeate therethrough from one side to the other side.

Examples of the porous film substrate include a polyolefin film and nonwoven fabrics made of polyethylene terephthalate (PET) or cellulose; generally, the porous film substrate is preferred to be especially a porous film mainly comprising a polyolefin (i.e., a porous polyolefin film) in being capable of melting and closing pores (namely, exerting a shut-down function) upon abnormal heat generation of a battery.

The proportion of the polyolefin component adopted when the A layer is a porous polyolefin film is required to be 50% by volume or more of the A layer, preferably 90% by volume or more, and more preferably 95% by volume or more.

It is preferred that a high-molecular-weight component having a weight average molecular weight of $5\times10^5$ to $15\times10^6$ is contained in the polyolefin component of the porous polyolefin film. When the A layer is a porous polyolefin film, the inclusion of a polyolefin component having a weight average molecular weight of 1,000,000 or more as the polyolefin component of the A layer is preferred because this increases the strength of the A layer as well as the strength of the entire laminated porous film including the A layer.

Examples of the polyolefin include high molecular weight homopolymers or copolymers produced by polymerizing ethylene, propylene, 1-butene, 4-methyl-1-pentene, 1-hexene, etc. Of these, preferred is a high molecular weight polyethylene mainly comprising ethylene and having a weight average molecular weight of 1,000,000 or more.

The pore diameter of the A layer is preferably 3 µm or less, more preferably 1 µm or less in ion permeability or in preventing particles from entering into a positive electrode or a negative electrode when used as a separator of a battery.

The air permeability of the A layer expressed in Gurley value is usually within the range of 30 to 500 sec/100 cc, preferably within the range of 50 to 300 sec/100 cc.

If the A layer has an air permeability within the above-mentioned range, sufficient ion permeability can be obtained in use as a separator.

The thickness of the A layer is determined appropriately with consideration given to the thickness of the heat-resistant layer of the laminated porous film.

Especially in the case of using the A layer as a substrate and forming the B layer by applying the coating liquid onto one or both of the surface of the A layer, the thickness of the A layer is preferably 4 to 40 µm, more preferably 7 to 30 µm.

The porosity of the A layer is preferably 20 to 80% by volume, and more preferably 30 to 70% by volume. Within such a range, the porous polyolefin film excels in ion permeability and it exhibits excellent characteristics when used as a separator for a non-aqueous electrolyte secondary battery. If the porosity is less than 20% by volume, the retention of an electrolytic solution may be reduced, whereas if the porosity is greater than 80% by volume, pores may be closed insufficiently at high temperatures at which shut-down occurs, that is, an electric current may fail to be blocked successfully when a battery generates heat abnormally.

The weight per area of the A layer is usually 4 to 15 g/m² and preferably 5 to 12 g/m² because in view of the strength, thickness, handleability, and weight of the laminated porous film as well as the capability of increasing the weight energy density or the volume energy density of a battery in use as a separator of the battery.

The method for producing the A layer is not particularly restricted and examples thereof include a method in which a plasticizer is added to a thermoplastic resin, followed by forming into a film, and then the plasticizer is removed with an appropriate solvent as disclosed in JP-A-7-29563, and a method in which using a film made of a thermoplastic resin produced by a known method, structurally weak amorphous parts of the film are selectively stretched to form fine pores as disclosed in JP-A-7-304110. For example, in the event that the A layer is formed from a polyolefin resin containing a ultrahigh molecular weight polyethylene and a low molecular weight polyolefin having a weight average molecular weight of 10,000 or less, it is preferred to produce it by the method shown below from the viewpoint of production cost.

Specifically, the A layer can be formed by a method comprising:
(1) a step of kneading 100 parts by weight of the ultrahigh molecular weight polyethylene, 5 to 200 parts by weight of the low molecular weight polyolefin having a weight average molecular weight of 10,000 or less, and 100 to 400 parts by weight of an inorganic filler, such as calcium carbonate, to obtain a polyolefin resin composition,
(2) a step of forming a sheet using the polyolefin resin composition,
(3) a step of removing the inorganic filler from the sheet obtained in step (2),
(4) a step of stretching the sheet obtained in step (3) thereby to obtain an A layer.

The A layer may be a commercially available product and preferably has the above-described characteristics.

<Heat-Resistant Layer (B Layer)>

The B layer is a heat-resistant layer comprising a binder resin and a filler and is formed by removing a medium from a coating liquid of the present invention comprising a filler, a binder resin, and the medium.

Specific examples of the method for forming the B layer include:
a method in which the coating liquid is applied to the A layer directly and then the medium is removed;
a method in which the coating liquid is applied to an appropriate support and then the medium is removed to form the B layer, which is then stuck to the A layer under pressure and then the support is peeled;
a method in which the coating liquid is applied to an appropriate support, subsequently stuck to the A layer under pressure, and peeled then from the support, and thereafter the medium is removed; and
a method in which the A layer is immersed into the coating liquid to perform dip coating, and then the medium is removed. As the support, a film of resin, a belt or drum of metal, etc. can be used.

In the case of laminating the B layer on both sides of the A layer, a sequential lamination method in which a B layer is formed on one side and then another B layer is laminated on the other side, or a simultaneous lamination method in which B layers are formed simultaneously on both of the surfaces of the A layer can be used.

Of the methods for forming the B layer, the method in which the coating liquid is applied to the A layer directly and then the medium is removed is preferred because it is simple and convenient and can easily control the amount to be applied of the coating liquid.

The method for applying the coating liquid to the A layer is not particularly restricted as long as it is a method capable of achieving wet-coating uniformly, and methods known in the art can be used. For example, there can be used capillary coating method, spin coating method, slit-die coating method, spray coating method, roll coat method, screen printing process, flexographic printing method, bar coater method, gravure coater method, and die coater method. The thickness of the B layer to be formed can be controlled by adjusting the amount to be applied of the coating liquid, the concentration of the binder resin in the coating liquid, and the ratio of the filler to the binder resin.

The method for removing the medium from the coating liquid having been applied to the A layer is commonly, but is not limited to, a method by drying.

In the case of having applied the coating liquid to the A layer, the temperature for drying the medium is preferably a temperature at which the air permeability of the A layer is not reduced, namely, a temperature that is equal to or lower than a temperature at which shut-down occurs.

The thickness of the B layer is usually 0.1 µm to 10 µm, and preferably within the range of from 2 µm to 6 µm. If the B layer is excessively thick, the load characteristics of a non-aqueous electrolyte secondary battery may deteriorate when the battery has been produce, whereas when the B layer is excessively thin, the separator may shrink due to failure to resist against the thermal shrinkage of the polyolefin porous film on heat generation of the battery.

When the B layer is formed on both sides of the A layer, the thickness of the B layer shall be defined by the total thickness of the both sides.

The B layer is a porous film, whose pore diameter is preferably 3 µm or less, more preferably 1 µm or less, as expressed by the diameter of a sphere to which the pores are approximated. If the average diameter of the pores or the pore size is greater than 3 µm, there is a possibility of occurrence of such problems that short circuit tends to occur when a carbon powder which is a main component of positive and negative electrodes or a fragment thereof drops.

The porosity of the layer B is preferably 30 to 90% by volume, and more preferably 40 to 85% by volume.

<Laminated Porous Film>

Using the coating liquid of the present invention, a highly heat-resistant B layer can be laminated without impairing the characteristics of the A layer because the load which the A layer receives during application is rendered extremely small. Accordingly, the coating liquid of the present invention is particularly useful for application to a porous film substrate with a high porosity that has a weak film structure and that is difficult to receive application, and a resulting laminated porous film can achieve a high ion permeability of the porous film substrate and high safety of the heat-resistant layer.

The laminated porous film of the present invention has an effect that the amount of the filler coming away is small. As referred to herein, that the amount of a filler coming away is small means that the peel strength to be achieved in a peel test using a tape is high or that the amount of the heat-resistant layer flaking off when the layer is rubbed on another object (i.e., the amount of powder coming away on rubbing) is small. In particular, in the case of using a laminated porous film as a non-aqueous electrolyte secondary battery separator, it is important that the amount of powder coming away on rubbing is small because a process to conveying the film on a roll is performed frequently.

The overall thickness of the laminated porous film (the A layer+ the B layer) is usually 5 to 80 µm, preferably 5 to 50 µm, and particularly preferably 6 to 35 µm. When the overall thickness of the laminated porous film is less than 5 µm, the laminated porous film is likely to rupture. If the thickness is excessively large, a non-aqueous electrolyte secondary battery in which the laminated porous film is used as the separator thereof tends to have a reduced electric capacitance.

The porosity of the entire part of the laminated porous film is usually 30 to 85% by volume, preferably 35 to 80% by volume.

The air permeability of the laminated porous film expressed in Gurley value is preferably 50 to 2000 sec/100 cc, more preferably 50 to 1000 sec/100 cc.

When a laminated porous film has an air permeability within such a range, it will exhibit sufficiently high ion permeability in the event that a non-aqueous electrolyte secondary battery is produced using the film as a separator, so that a loading characteristic that is high as a battery can be obtained.

The shape retention rate upon heating of the laminated porous film at high temperatures at which shutdown occurs, expressed by the smaller value of the MD direction or the TD direction, is preferably 95% or more, more preferably 97% or more. The MD direction as referred to herein means the longitudinal direction at the time of sheet production, and the TD direction means the width direction at the time of sheet production. The elevated temperature at which shutdown occurs is a temperature of 80 to 180° C. and is usually about 130° C. to about 150° C.

The laminated porous film may include a porous film other than the porous film substrate (A layer) and the heat-resistant layer (B layer), such as an adhesive film and a protective film, as long as the porous film does not drastically disturb the object of the present invention.

The laminated porous film of the present invention can be suitably used as a separators of batteries, especially, non-aqueous electrolyte secondary batteries such as lithium secondary batteries.

When a non-aqueous electrolyte secondary battery is produced using the laminated porous film of the present invention as a non-aqueous electrolyte secondary battery separator, a highly safe non-aqueous electrolyte secondary battery is obtained, the battery having high loading characteristics and allowing the separator to exert a shut-down function to avoid the contact of the positive electrode with the negative electrode caused by the shrinkage of the separator even when the battery has generated heat.

EXAMPLES

The present invention is described more concretely below with reference to Examples, but the invention is not limited thereto.

In the examples and the comparative examples, physical properties, etc. of the laminated porous films were measured by the methods described below.

(1) Thickness Measurement (Unit: μm):

The thickness of a film was measured with a high-accurate digital dimension meter manufactured by Mitutoyo Corporation.

(2) Weight Per Area (Unit: g/m$^2$):

A film was cut into a square measuring 10 cm long on each side and then the weight W (g) thereof was measured. Calculation was carried out by following weight per area (g/m$^2$)=W/(0.1×0.1)

The basis weight of the heat-resistant layer (B layer) was calculated by subtracting the weight per area of the porous film substrate (A layer) from the weight per area of the laminated porous film.

(3) Porosity:

A film was cut into a square measuring 10 cm long on each side, and then the weight W (g) and the thickness D (cm) thereof were measured. The weights of the materials contained in the sample were calculated, the weight Wi (g) of each material was divided by the true specific gravity to calculate the volume of each material, and then the porosity (% by volume) was calculated from the following formula.

The weight per area of each material was calculated from the amount used for film forming, and the ratio.

Porosity(% by volume)=100−[{($W1$/true specific gravity 1)+($W2$/true specific gravity 2)+ . . . +($Wn$/true specific gravity $n$)}/(100×$D$)]×100

(4) Air Permeability:

Air permeability was measured using a Gurley densometer equipped with a digital timer manufactured by Toyo Seiki Seisaku-sho Ltd. in accordance with JIS P8117.

(5) Shape Retention Ratio Upon Heating:

A film was cut into a size of 8 cm×8 cm. The film with a square of 6 cm×6 cm having been drawn thereon was sandwiched between paper sheets and was put into an oven heated at 150° C. One hour later, the film was taken out of the oven. Subsequently, the length of each side of the drawn square was measured, and a shape retention ratio upon heating was calculated. The calculation methods are as follows.

Length of a drawn line segment in MD before heating: L1
Length of a drawn line segment in TD before heating: L2
Length of a drawn line segment in MD after heating: L3
Length of a drawn line segment in TD after heating: L4
Shape retention ratio in MD upon heating (%)=(L3/L1)×100
Shape retention ratio in TD upon heating (%)=(L4/L2)×100

(6) Amount of Filler Coming Away:

Measurement was performed by a surface rubbing test using an abrader. One piece of Savina Minimax (produced by KB Seiren, LTD.) was mounted to a rubbing part of an abrader. The Savina Minimax was brought into contact with the B layer side of the above-described laminated porous film under the application of a weight of 1000 g and then was rubbed back and forth once at a rate of 45 rpm. The amount of filler coming away was calculated by subtracting the weight per unit area (m$^2$) of the rubbed part of the laminated porous film from the weight per unit area (m$^2$) of the laminated porous film before the test.

(7) Surface Smoothness Measurement:

Measurement was performed using a confocal microscope PLμ2300. Surface smoothness was expressed by the value of root mean square surface roughness rms, which is an index of irregularity.

<Production of Porous Film Substrate (A Layer)>

A polyolefin resin composition was prepared by adding 70% by weight of an ultrahigh molecular weight polyethylene powder (340M, produced by Mitsui Chemicals, Inc.) and 30% by weight of a polyethylene wax with a weight average molecular weight of 1000 (FNP-0115, produced by Nippon Seiro Co., Ltd.) as well as, per 100 parts by weight of the ultrahigh molecular weight polyethylene and the polyethylene wax in total, 0.4 parts by weight of an antioxidant (Irg 1010, produced by Ciba Specialty Chemicals), 0.1 parts by weight of an antioxidant (P168, produced by Ciba Specialty Chemicals), and 1.3 parts by weight of sodium stearate, further adding calcium carbonate with an average particle diameter of 0.1 μm (produced by Maruo Calcium Co., Ltd.) so as to occupy 38% by volume based on the overall volume, mixing these ingredients in the form of powder with a Henschel mixer, followed by melt-kneading with a twin screw kneading machine. The polyolefin resin composition was rolled into a sheet with a pair of rolls having a surface temperature of 150° C. Calcium carbonate was removed by immersing the sheet into an aqueous hydrochloric acid solution (hydrochloric acid: 4 mol/L, nonionic surfactant: 0.5% by weight) and then the sheet was drawn 6 times at 105° C., affording the following porous film substrates A1, A2, and A3.
<A1>
  Thickness: 19.2 μm
  Weight per area: 7.1 g/m$^2$
  Air permeability: 82 sec/100 cc
<A2>
  Thickness: 14.9 μm
  Weight per area: 6.7 g/m$^2$
  Air permeability: 115 sec/100 cc
<A3>
  Thickness: 15.3 μm
  Weight per area: 6.7 g/m$^2$
  Air permeability: 91 sec/100 cc
<Binder Resin and Filler>
  The binder resin and the filler which were used for B layer formation are as follows.
<Binder Resin>
  Sodium carboxymethyl cellulose (CMC): Cellogen 3H, produced by Dai-Ichi Kogyo Seiyaku Co., Ltd.
<Filler>
  Filler (a1)
  Material: alumina
  Average particle diameter: 0.15 μm
  Specific surface area: 10.3 m$^2$/g
  Particle shape: non-spherical bound particles
  Filler (a2)
  Material: alumina
  Average particle diameter: 0.10 μm
  Specific surface area: 14.5 m$^2$/g
  Particle shape: non-bound particles
  Filler (a3)
  Material: alumina
  Average particle diameter: 0.024 μm
  Specific surface area: 70 m$^2$/g
  Particle shape: non-bound particles
  Filler (b1)
  Material: alumina
  Average particle diameter: 0.54 μm
  Specific surface area: 4.3 m$^2$/g
  Particle shape: non-spherical bound particles
  Filler (b2)
  Material: alumina
  Average particle diameter: 0.42 μm
  Specific surface area: 4.8 m$^2$/g
  Particle shape: non-bound particles Example 1

(1) Production of Coating Liquid

The coating slurry of Example 1 was prepared in the following procedures.

First, a CMC solution having a CMC concentration of 0.7% by weight (based on [CMC+ solvent]) was obtained by dissolving in a water-ethanol mixed solvent (water:ethanol=70:30 (weight ratio)).

Subsequently, 1050 parts by weight of filler (a1) and 2450 parts by weight of filler (b1) were added to the CMC solution containing 100 parts by weight of CMC, followed by stirring and mixing. Furthermore, the mixed liquid was passed through an APV Gaulin Homogenizer (15MR-8TA) under the application of a pressure of 60 MPa, so that the fillers were dispersed. Coating liquid 1 was prepared by performing the operation of passing the liquid under pressure three times. The composition of the coating liquid prepared by the method described above is shown in Table 1.

(2) Production and Evaluation of Laminated Porous Film

A B layer was formed by applying the above-described coating liquid to one side of a porous film substrate (A1) with a gravure coater and then drying it. Subsequently, a B layer was laminated in the same manner on the other side of the A layer (A1). Thus, a laminated porous film in which the B layers were laminated on both sides of the A layer was obtained. The thickness of the B layers is the total thickness of the B layers provided on both sides. The physical properties of the laminated porous film prepared by the above-described method are shown in Table 2.

Example 2

(1) Production of Coating Liquid

The coating slurry of Example 2 was prepared in the following procedures.

First, a CMC solution having a CMC concentration of 0.74% by weight (based on [CMC+ solvent]) was obtained by dissolving in a water-isopropanol (IPA) mixed solvent (water:IPA=84:16 (weight ratio)).

Subsequently, 400 parts by weight of filler (a2) and 3600 parts by weight of filler (b1) were added to the CMC solution containing 100 parts by weight of CMC, followed by stirring and mixing. Furthermore, the mixed liquid was passed through an APV Gaulin Homogenizer (15MR-8TA) under the application of a pressure of 60 MPa, so that the fillers were dispersed. Coating liquid 2 was prepared by performing the operation of passing the liquid under pressure three times. The composition of the coating liquid prepared by the method described above is shown in Table 1.

(2) Production and Evaluation of Laminated Porous Film

A B layer was formed by applying the above-described coating liquid to one side of a porous film substrate (A2) with a gravure coater and then drying it. Subsequently, a B layer was laminated in the same manner on the other side of the A layer (A2). Thus, a laminated porous film in which the B layers were laminated on both sides of the A layer was obtained. The thickness of the B layers is the total thickness of the B layers provided on both sides. The physical properties of the laminated porous film prepared by the above-described method are shown in Table 2.

Example 3

(1) Production of Coating Liquid

The coating slurry of Example 3 was prepared in the following procedures.

First, a CMC solution having a CMC concentration of 0.6% by weight (based on [CMC+ solvent]) was obtained by dissolving in a water-ethanol mixed solvent (water:ethanol=70:30 (weight ratio)).

Subsequently, 500 parts by weight of filler (a3) and 3000 parts by weight of filler (b2) were added to the CMC solution containing 100 parts by weight of CMC, followed by stirring and mixing. Furthermore, the mixed liquid was passed through an APV Gaulin Homogenizer (15MR-8TA) under the application of a pressure of 60 MPa, so that the fillers were dispersed. Coating liquid 3 was prepared by performing the operation of passing the liquid under pressure three times. The composition of the coating liquid prepared by the method described above is shown in Table 1.

(2) Production and Evaluation of Laminated Porous Film

A laminated porous film was obtained by the same operations as those in Example 1 except applying the coating liquid 3 onto the porous film substrate (A3). The properties of the resulting laminated porous film are shown in Table 2.

Comparative Example 1

(1) Production of Coating Liquid

Coating liquid 4 was obtained in the same way as the method for the preparation of the coating liquid of Example 1 except using 3500 parts by weight of filler (b1) as a filler.

(2) Production and Evaluation of Laminated Porous Film

A laminated porous film was obtained by the same operations as those in Example 1 except applying the coating liquid 4 onto the porous film substrate (A1). The properties of the resulting laminated porous film are shown in Table 2.

TABLE 1

| | Solid charge | | | | | Composition of coating liquid | | | |
|---|---|---|---|---|---|---|---|---|---|
| | Water-soluble polymer | Filler (a) | | | Filler (b) | | Composition of solvent | | Ratio of solid to (solvent + solid) |
| | (CMC) Part by weight | Filler (a1) Part by weight | Filler (a2) Part by weight | Filler (a3) Part by weight | Filler (b1) Part by weight | Filler (b2) Part by weight | Water % by weight | Ethanol % by weight | IPA % by weight | % by weight |
| Coating liquid 1 | 100 | 1050 | — | — | 2450 | — | 70 | 30 | — | 20 |
| Coating liquid 2 | 100 | — | 400 | — | 3600 | — | 84 | — | 16 | 23 |
| Coating liquid 3 | 100 | — | — | 500 | — | 3000 | 70 | 30 | — | 18 |
| Coating liquid 4 | 100 | — | — | — | 3500 | — | 70 | 30 | — | 20 |

*IPA: isopropanol

TABLE 2

| | Coating liquid | A layer | Thickness [μm] A layer + B layer | | Weight per area [g/m²] A layer + B layer | | Porosity [% by volume] | | Air permeability [sec/100 cc] | | Shape retention ratio on 150° C. heating [%] | | Amount of filler coming away [g/m²] | Surface roughness (rms) [μm] |
|---|---|---|---|---|---|---|---|---|---|---|---|---|---|---|
| | | | | B layer | | B layer | A layer | B layer | A layer | B layer | A layer + B layer MD | TD | | |
| Example 1 | Coating liquid 1 | A1 | 24.6 | 5.4 | 19.4 | 12.3 | 60 | 57 | 154 | | 99 | 99 | 0.18 | 0.26 |
| Example 2 | Coating liquid 2 | A2 | 24.9 | 10.0 | 22.0 | 15.3 | 52 | 60 | 172 | | 99 | 99 | 0.14 | 0.34 |
| Example 3 | Coating liquid 3 | A3 | 26.2 | 10.9 | 19.8 | 13.1 | 53 | 69 | 142 | | 99 | 99 | 0.12 | 0.73 |
| Comparative Example 1 | Coating liquid 4 | A1 | 24.1 | 4.9 | 18.0 | 10.9 | 60 | 61 | 144 | | 98 | 99 | 2.44 | 0.38 |

INDUSTRIAL APPLICABILITY

According to the present invention, there can be provided a laminated porous film suitable as a non-aqueous electrolyte secondary battery separator, the laminated porous film having a heat-resistant layer in which a filler is inhibited from coming away and which is high in shape retention property under heating, and being excellent in ion permeability.

Therefore, a laminated porous film suitable as a non-aqueous electrolyte secondary battery separator is provided, the laminated porous film being excellent in dimension stability at high temperatures and in ion permeability, and having a porous layer laminated that is unlikely to come away and is excellent in smoothness. A non-aqueous electrolyte secondary battery using the laminated porous film as a separator allows the separator to prevent the positive electrode and the negative electrode from coming into direct contact with each other even if the battery generates heat, and high-output and high-capacity non-aqueous electrolyte secondary batteries can be manufactured stably. The present invention is therefore very useful in the industry.

The invention claimed is:

1. A coating liquid comprising a binder resin, a filler and a medium, wherein the filler is a mixture comprising (a) a filler having a specific surface area of not less than 7 $m^2/g$ and not more than 80 $m^2/g$ and (b) a filler having a specific surface area of not less than 3 $m^2/g$ and not more than 6 $m^2/g$ in a filler (a) to filler (b) weight ratio of from 10:90 to 30:70.

2. The coating liquid according to claim 1, wherein the specific surface area of the filler (a) is not less than 7 $m^2/g$ and not more than 40 $m^2/g$.

3. The coating liquid according to claim 1, wherein the weight proportion of the filler is not less than 20 and not more than 100 where the weight of the binder resin is taken as 1.

4. The coating liquid according to claim 1, wherein 70% by weight or more of the whole of the filler (b) comprises bound particles in a form in which a plurality of primary particles have aggregated and adhered to each other.

5. The coating liquid according to claim 1, wherein 70% by weight or more of the whole of the filler (b) comprises non-spherical bound particles in a form in which a plurality of primary particles have aggregated and adhered to each other.

6. The coating liquid according to claim 1, wherein the filler is an inorganic filler.

7. The coating liquid according to claim 6, wherein the inorganic filler is alumina.

8. The coating liquid according to claim 1, wherein the binder resin is a water-soluble polymer.

9. The coating liquid according to claim 8, wherein the water-soluble polymer is at least one member selected from the group consisting of carboxyalkyl celluloses, alkyl celluloses, hydroxyalkyl celluloses, starch, polyvinyl alcohol and sodium alginate.

10. A laminated porous film in which a heat-resistant layer comprising a filler and a binder resin is laminated on one or both of the surfaces of a porous film substrate, wherein the heat-resistant layer is a heat-resistant layer formed by removing the medium from the coating liquid according to claim 1.

11. The laminated porous film according to claim 10, wherein the porous film substrate is a porous film comprising 50% by volume or more of a polyolefin.

12. A method for producing a laminated porous film in which a heat-resistant layer comprising a filler and a binder resin is laminated on one or both of the surfaces of a porous film substrate, the method comprising a step of forming the heat-resistant layer by removing the medium from the coating liquid according to claim 1.

13. The method according to claim 12, the method further comprising a step of applying the coating liquid directly to the porous film substrate.

* * * * *